Feb. 22, 1938.　　　E. W. FAWCETT ET AL　　　2,109,129
APPARATUS FOR HIGH VACUUM DISTILLATIONS
Filed July 30, 1936
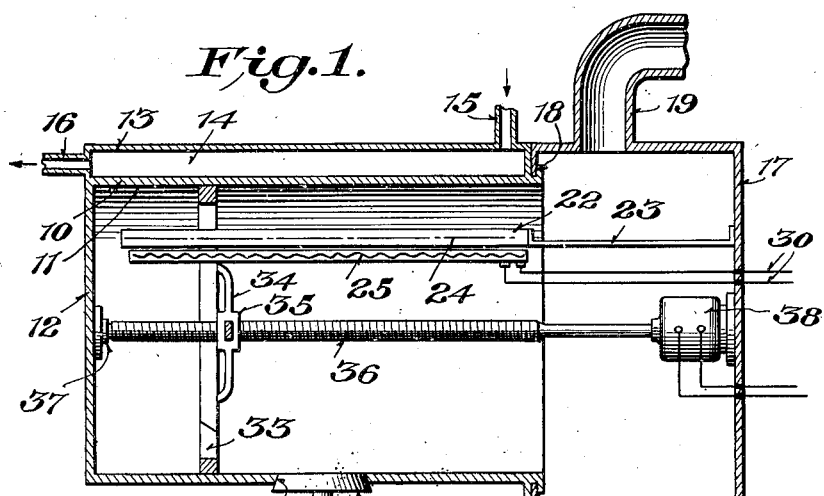
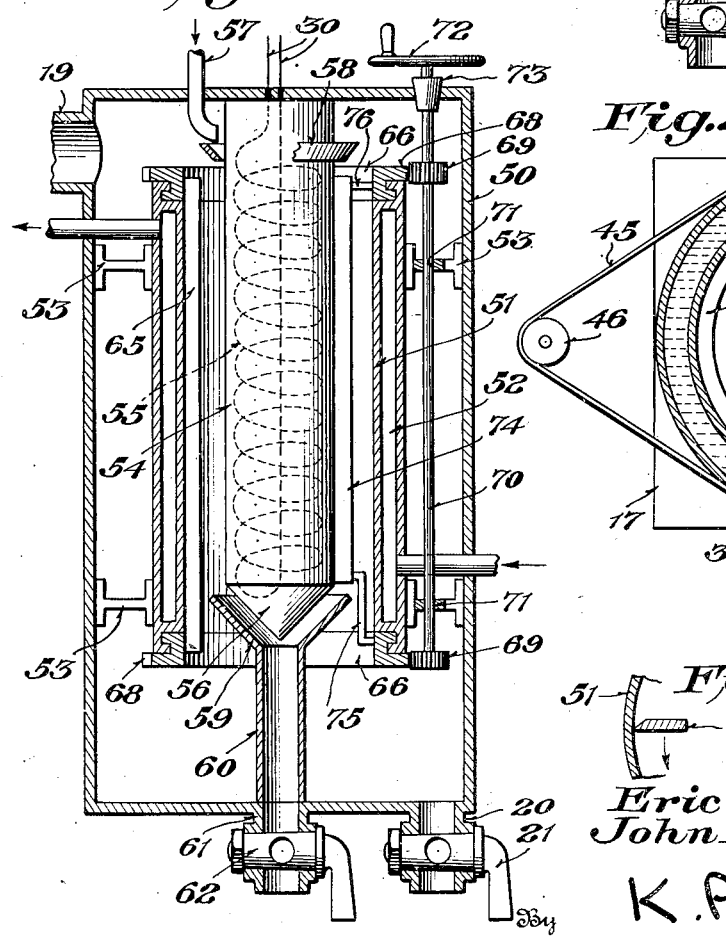
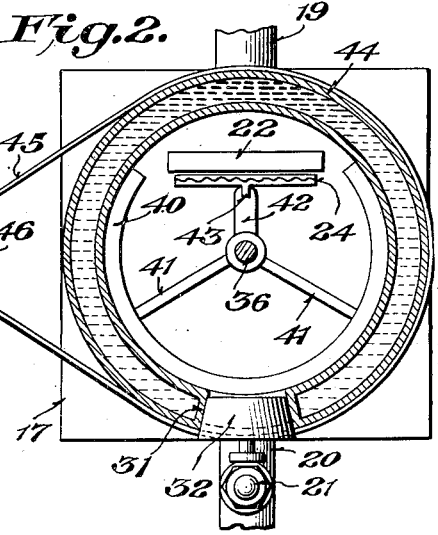
Inventors
Eric W. Fawcett,
John L. McCowen,
By K. P. McElroy
Attorney Patented Feb. 22, 1938

2,109,129

UNITED STATES PATENT OFFICE 2,109,129

APPARATUS FOR HIGH VACUUM DISTILLATIONS

Eric William Fawcett and John Lewis McCowen, Northwich, England, assignors to Imperial Chemical Industries Limited, a corporation of Great Britain Application July 30, 1936, Serial No. 93,338
In Great Britain March 7, 1934

8 Claims. (Cl. 202—205)

This invention relates to improvements in apparatus for high vacuum distillation; and it comprises an apparatus organization for high vacuum distillation of materials yielding upon distillation at least one non-fluent component, comprising a chamber adapted to be evacuated, means providing a hot surface in the chamber, means providing a cool surface in the chamber and means in the chamber for scraping at least one of said surfaces to remove materials therefrom; all as more fully hereinafter set forth and as claimed.

The invention relates to the distillation under high vacuum of substances, liquid or solid, which yield either a solid (i. e. non-flowing) distillate, or a solid residue, or both, and more especially to molecular distillation in which the distilling and condensing surfaces are in very close proximity, namely of the order of the mean free path of the distilling molecules at the pressure within the apparatus.

The principal object of the invention is to provide a means for overcoming the difficulty of removing the solid distillation products from the distilling or condensing surfaces, a difficulty which has hitherto hindered the commercial application of the technique of high-vacuum distillation to the treatment of solid substances or substances yielding solid products.

The present invention is applicable to the treatment of initial substances which are solid under the distillation conditions and which yield a solid residue or distillate under these conditions, i. e., a process which from one aspect may be regarded as "high vacuum sublimation", also to the treatment of substances which initially are liquid or which are introduced to the heating surface or surfaces incorporated with a liquid carrier medium to form a fluent mixture, and yield a solid residue or distillate.

The invention comprises the provision within a vacuum distillation chamber of an intermittently or continuously operated scraping device adapted to traverse the condensing surface (or surfaces) on the distilling surface (or surfaces) or both, removing by scraping solid material from the said surfaces, and depositing said solid material in a suitably disposed receptacle or receptacles from which the solid material can be removed as desired.

In the accompanying drawing is shown, more or less diagrammatically, three examples of specific embodiments of apparatus within the purview of the invention. In the drawing, Fig. 1 is a diagrammatic view, partly in vertical section and partly in elevation, of a still having horizontal surfaces;

Fig. 2 is a view illustrating a modification of the apparatus of Fig. 1;

Fig. 3 is a diagrammatic view, partly in vertical section and partly in elevation, of a still having vertical cylindrical surfaces; and Fig. 4 is a detail view to show the shape of the scrapers in the apparatus of Fig. 3.

In the drawing, in which like reference characters indicate like parts, Fig. 1 shows a horizontal type still. It comprises a cylindrical distillation chamber 10, the upper inner surface of which, indicated at 11, forms the cold or condensing surface. The chamber has a head 12 on one end. The upper portion of the cylinder is provided with a jacket 13 defining a chamber 14 and having an inlet 15 and outlet 16 for circulation of cooling liquid. The cylinder is mounted for rotation in a stationary head box 17, a suitable flanged, vacuum-tight rotary joint being provided as indicated at 18. The head box has an outlet 19 adapted to be put in communication with a high vacuum pump (not shown), and an outlet 20, closed by a vacuum-tight valve indicated at 21, for withdrawal of condensate.

The hot surface takes the form of a shallow tray 22 suitably supported adjacent the upper part of cylinder 10 as by a bracket 23 and spaced from the cold surface 11 a centimeter or thereabouts. The tray is adapted to contain a thin layer of material to be distilled, indicated at 24. The tray is heated by an electrical heating element indicated diagrammatically at 25 and supplied with current by wires 30.

Material to be distilled is introduced into the tray through a manhole 31 hermetically closable by a cover 32. In filling the tray, the manhole is brought to the top by turning cylinder 10.

In operation, material, e. g. beta-aminoanthraquinone or other substance referred to post, is distilled and condenses as a non-fluent crust or the like on surface 11. Means are provided for removing the adhering condensate, comprising a scraper ring 33 advantageously of the type of an engine piston ring and making a snug sliding fit in cylinder 10. The ring has attached thereto a spider 34 having a central nut 35. The ring is adapted to be moved axially along the length of the cylinder by means of a threaded shaft 36, engaging the nut and journaled in head 12 as at 37. A reversible motor 38 mounted inside head box 17 is arranged to drive the shaft as shown. Upon operating the motor, the ring is caused to move the length of the chamber 10 and scrape material towards the outlet 20. In order to prevent material scraped off by the ring from falling back into the tray, cylinder 10 is rotated manually or otherwise, through a sufficient angle to prevent such falling back, prior to actuating the scraper.

As an example of the use of this still, a typical evaporative distillation operation may take from one to two hours. Distillation is started as described and when a thin layer of condensate forms on surface 11 to a predetermined thickness which may occur every ten or fifteen minutes, drum 10 is tilted and the scraper ring set in operation, and is moved the length of the cylinder from left to right and then back again. The drum is then tilted back and distillation is resumed. The time required for the traverse of the scraper may be half a minute or less, so that the scraping time is usually negligible compared with the operating or distilling time.

Fig. 2 shows a modification in which periodic tilting of the cylinder is done away with. In this modification, a modified ring 40 is provided cut away at the top, as shown, carried by a spider 41 driven by shaft 36. The spider has a guide portion 42 cooperating with a rail 43 on the lower portion of the tray structure, so as to keep the spider from rotating while allowing lengthwise motion. In this modification, cylinder 10 is arranged with an outer jacket 44 completely surrounding it, so that the entire surface is cooled. In operation, cylinder 10 is rotated slowly and continuously, as by a belt 45 and pulley 46 driven by suitable slow-speed power means, not shown. Thus condensate is continuously brought to non-fouling position and is removed during operation. In this modification, it is advantageous to operate the ring, in the outward (right-to-left) direction, at a fairly rapid rate, so that the ring will not force any appreciable amount of condensate outward. In practice, suitable swivel conduit connections (not shown) are provided for the flow of cooling water to permit such circulation while the cylinder rotates.

The stills of Figs. 1 and 2 are well suited not only for distilling liquid materials which give non-fluent distillates, but also for distilling materials in which the raw material, the residue and the distillate are all non-fluent. Powdered solid materials can readily be spread on the tray and any residue scraped or otherwise removed from the tray after distillation is finished.

Fig. 3 shows a modification particularly well adapted for continuous operation. The apparatus comprises a cylindrical distillation chamber 50 having a vacuum outlet 19 communicating with a high vacuum pump (not shown), and an outlet 20 with valve 21, as in Fig. 1. In this still, the cold surface takes the form of a double walled cylinder 51 enclosing a chamber 52 and an outlet connection 15 and outlet 16 for cold water or other cooling fluid circulated through the chamber. The cylinder is supported from the distillation chamber walls by brackets 53. The hot surface takes the form of a hollow cylinder 54 concentric with and closely adjacent cylinder 51 and having inside it any suitable heating means, indicated by way of example as an electrical resistance heating coil 55 supplied by wires 30. The bottom of cylinder 54 is closed by a tapering cap 56 as shown. Material to be distilled is fed in fluent condition through an inlet pipe 57 and is distributed in a thin film to the outer surface of cylinder 54 with the aid of a conical distributor 58. A funnel-like collector 59 is positioned adjacent the lower portion of the cylinder, as shown, and delivers through an outlet conduit 60 to an outlet 61 in chamber 50, valved as at 62. This means is for removing undistilled residue.

Scraper means are provided, comprising a sharp-edged scraper blade 65 engaging the surface of cylinder 51 and mounted at top and bottom on rings 66 adapted to be supported for rotation in an annular groove 67 at each end of cylinder 51, as shown. The scraper advantageously has a cross-section such as shown in Fig. 4. Rings 66 are provided with rims 68 having gear teeth. The rings are driven by means of two pinions 69 mounted on a shaft 70 journaled as at 71 in brackets 53 and extending out through cylinder 50. The exposed end of the shaft is provided with a handle 72. A vacuum-tight bearing 73 is provided to prevent leakage around the shaft. Upon rotating the handle, the scraper is caused to move over the cold surface and remove material adhering thereto, which falls to the bottom of chamber 50. If desired, shaft 70 may be operated by an electric motor as in Fig. 1. The apparatus is shown as also having a scraper adapted to remove any material from the wall of cylinder 54. This is advantageous where the distillation residue is non-fluent in character. Thus, a scraper bar 74 is provided engaging cylinder 54 and supported from rings 66 by supporting members 75 and 76 as shown.

In operation, the apparatus is put under very high vacuum through outlet 19. Cylinder 54 is brought to proper temperature and cooling fluid is circulated through chamber 52. Through pipe 57 is fed the substance to be distilled. Fluid mixture flows over hot surface 54 and is subject to evaporation in its downward course. Vaporizing constituents condense on cold surface 51. From time to time or continuously, handle 72 is turned to cause material to drop from the cold surface into the lower portion of chamber 50. Undistillable residue, if any, drops into collector 59. From time to time, undistillable residue is taken off through valve 62 and the distilled product is taken off through valve 21.

These stills are usually made of steel or stainless steel, and can be made in any other material to suit particular requirements.

In a typical process making use of the present invention, a quantity of crude beta-aminoanthraquinone to be purified (melting point about 298° C.) was mixed with about an equal weight of a petroleum oil which had previously been freed by evaporative distillation, of all matter volatile under the conditions of the evaporative distillation. The fluent mixture was fed through pipe 57 of the apparatus of Fig. 3 to the hot surface, which was maintained at about 120° C. A vacuum was maintained in the chamber of the order of $10^{-5}$ mm. of mercury. The cold surface in this example was 2 cm. from the hot surface. Pure beta-aminoanthraquinone (melting point 311° C.) evaporated off and condensed on the cold surface, while the impurities remained on the hot surface and were removed through outlet 60, together with the petroleum oil. The condensate was removed by slowly rotating the scrapers.

In carrying out such process in the apparatus of Figs. 1 and 2, the crude solid material can be put directly in the tray. Condensate is removed by operating the scraping ring as described.

As examples of distillation operations to which the present invention may be applied with advantage, may be mentioned the extraction of caffeine from ground dried coffee beans, the extraction of quinine from barks containing the same, the purification of crude beta-aminoanthraquinone, etc., in all which cases a solid distillate is obtained which is removed according to the invention. In distilling these (solid) materials in the apparatus of Fig. 3, they are dissolved or suspended in comminuted form in a carrier medium of such character as to form a fluent mixture under the conditions of distillation; e. g., a linseed stand oil or a petroleum oil which has been previously freed of light volatiles by evaporative distillation. In the apparatus of Fig. 1, the materials can be put directly in the tray in comminuted form.

This case is a continuation-in-part of our prior application, Serial No. 9,873, filed March 7, 1935.

What we claim is:—

1. In a molecular distillation apparatus having an element providing a hot surface, the combination of scraping means, means providing a condensing surface closely spaced from the hot surface at a distance of the same order as the mean free path of molecules to be distilled, and means so constructed and arranged as to effect relative movement between said scraping means and said condensing surface so as to remove distillate from the condensing surface.

2. An apparatus for effecting short path high vacuum distillation comprising means providing a cooled condensing surface, an evaporating surface substantially parallel to the said condensing surface and located a distance therefrom of the same order as the mean free path of molecules to be distilled, means for distributing material to be distilled over the evaporating surface, a scraping device in sliding contact with the cooled condensing surface and adapted to scrape the cooled condensing surface, said evaporating and condensing surfaces being enclosed so that they can be maintained under high vacuum, and a receptacle for the reception of material scraped from the said condensing surface.

3. Apparatus for high vacuum distillation of materials yielding upon distillation at least one non-fluent component, comprising a chamber adapted to be evacuated, means providing a hot evaporating surface in the chamber, means providing a cool condensing surface in the chamber closely spaced from the hot surface and adapted to receive the distilled component, and means in the chamber for scraping at least one of said surfaces to remove materials therefrom.

4. Apparatus for high vacuum distillation of materials yielding upon distillation a non-fluent distillate, comprising a chamber adapted to be evacuated, means providing a hot evaporating surface within the chamber, means providing a cool condensing surface in the chamber closely spaced from the hot surface and adapted to receive the distillate, and means in the chamber for scraping the cool surface to remove condensed material therefrom, so as to expose the cool surface for reception of distillate.

5. Apparatus for high vacuum distillation of materials yielding upon distillation a non-fluent distillate, comprising a chamber adapted to be evacuated, a flat horizontal member arranged to provide a hot surface and to retain a body of raw material to be distilled, closely adjacent means providing a cool surface for condensing distilled material within the chamber, and means in the chamber for scraping the cool surface to remove condensed material therefrom.

6. In a high vacuum distillation apparatus adapted for distillation of materials yielding a non-fluent distillate upon distillation and having means providing a heated surface and a closely spaced cold surface for condensation of such materials, the improvement comprising a member arranged in contact with the cold surface and movable with respect thereto, and means for moving said member over the cold surface to detach condensate therefrom.

7. Apparatus for distillation of materials having non-fluent components, comprising means providing a heated surface, means providing a cooling surface closely spaced therefrom, means for scraping at least one of said surfaces to detach non-fluent materials therefrom and a housing enclosing said surfaces and said scraping means.

8. In a molecular distillation apparatus having an element providing a hot surface, the combination of scraping means, means providing a condensing surface closely spaced from the hot surface at a distance of the same order as the mean free path of molecules to be distilled, and means so constructed and arranged as to effect relative movement between said scraping means and said hot surface so as to remove residue from the hot surface.

ERIC WILLIAM FAWCETT.
JOHN L. McCOWEN.